J. P. OLSON.
WATERING TROUGH.
APPLICATION FILED JAN. 11, 1915.

1,150,877.

Patented Aug. 24, 1915.

Witnesses
Arthur K Moore
Harry M. Test

Inventor
J. P. Olson
By Chandler Chandler
Attorneys

UNITED STATES PATENT OFFICE.

JOHN P. OLSON, OF BERESFORD, SOUTH DAKOTA.

WATERING-TROUGH.

1,150,877. Specification of Letters Patent. Patented Aug. 24, 1915.

Application filed January 11, 1915. Serial No. 1,645.

*To all whom it may concern:*

Be it known that I, JOHN P. OLSON, a citizen of the United States, residing at Beresford, in the county of Union, State of South Dakota, have invented certain new and useful Improvements in Watering-Troughs; and I do hereby declare the following to be a full, clear, and exact description of the invention, such as will enable others skilled in the art to which it appertains to make and use the same.

This invention relates to improvements in watering troughs and particularly to troughs adapted for watering of stock.

The principal object of the invention is to provide a device of this character of such construction that the water therein will be prevented from freezing in cold weather.

Another object is to provide a device of this character of such construction that the heat passages are protected against entrance of water which would tend to run to the source of heat and extinguish the same.

Other objects and advantages will be apparent from the following description when taken in connection with the accompanying drawings.

Figure 1:
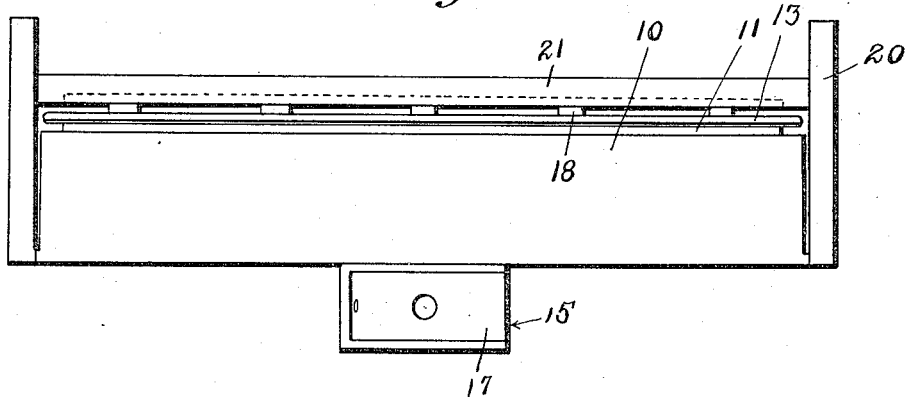
Figure 2:
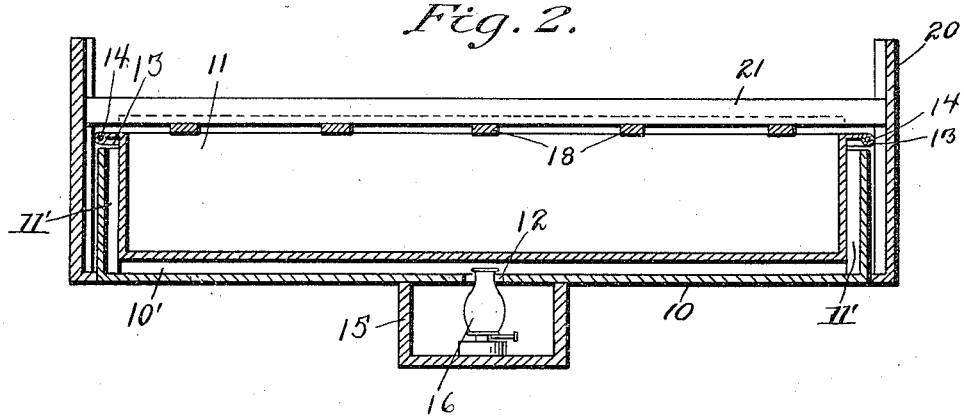
Figure 3:
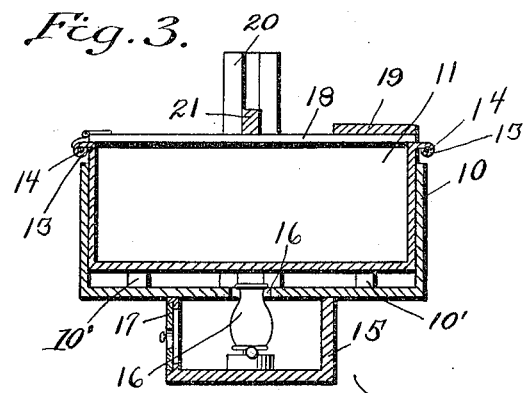

In the drawings: Figure 1 is a side elevation of the trough made in accordance with my invention, Fig. 2 is a vertical longitudinal sectional view through the device, and Fig. 3 is a transverse sectional view through the device.

Referring particularly to the accompanying drawing, 10 represents a suitable open-topped receptacle, within which is placed and suitably spaced therefrom a slightly smaller receptacle 11 which is adapted to contain water. This inner receptacle is spaced from the outer receptacle at the ends by means of strips 11′, and at the bottom by means of strips 10′, this space forming a passage for hot air which issues upwardly through an opening 12 formed centrally in the bottom of the receptacle 10. On each end and at the upper edge of the inner receptacle there is an outwardly extending and upwardly bowed rim 13 which is suitably reinforced by the wires 14, these rims extending a suitable distance beyond the upper edge of the sides of the receptacle 10. These rims effectively prevent any water which might splash from the inner receptacle from entering the hot air passage and finally passing through the opening 12 to the lamp which will now be described.

Secured to the bottom of the receptacle 10, and below the opening 12 is a box 15 in which is mounted a suitable lamp 16 having a chimney 17 extending upwardly to the opening 12 in position to discharge heat therefrom. In the front of the box is a sliding member 17 by means of which access is gained to the box to light or extinguish the lamp.

It will thus be seen that I have provided a simple device of this character and one which will effectively keep the water in the tank above the freezing point.

It will be noted that rolled flanges 13 by reason of the fact that they extend outwardly beyond the edges of the sides of the receptacle 10 prevent the entrance of water into the hot air space.

A hinged cover is carried by the tank, the same consisting of the transverse slats 18 and a longitudinal strip 19 connecting them at the hinged end of the cover. At each end of the tank is a vertical slideway 20 in which the ends of a longitudinal guard bar 21 is arranged to slide said guard normally resting on the ends of the transverse slats 18. This cover thus permits the animals to drink from the tank while effectively preventing them from getting into the tank.

What is claimed is:

A watering trough comprising an outer receptacle and an inner water tank, vertical slideways at the ends of the outer receptacle, a cover for the tank having openings to permit the animals to drink, and a guard bar vertically slidable in the slideways to prevent the animals from raising the cover.

In testimony whereof, I affix my signature, in the presence of two witnesses.

JOHN P. OLSON.

Witnesses:
 NILS OLSON,
 A. ERICKSON.

Copies of this patent may be obtained for five cents each, by addressing the "Commissioner of Patents, Washington, D. C."